United States Patent [19]

Kim

[11] Patent Number: 5,754,374
[45] Date of Patent: May 19, 1998

[54] DYNAMIC PRESSURE BEARING APPARATUS AND HEAD DRUM ASSEMBLY OF A VIDEO CASSETTE RECORDER UTILIZING THE SAME

[75] Inventor: Keum-Mo Kim, Seoul, Rep. of Korea

[73] Assignee: Daewoo Electronics Co., Ltd., Seoul, Rep. of Korea

[21] Appl. No.: 739,019

[22] Filed: Oct. 28, 1996

[30] Foreign Application Priority Data

| Oct. 28, 1995 | [KR] | Rep. of Korea | 1995-30838 U |
| Oct. 28, 1995 | [KR] | Rep. of Korea | 1995-30839 U |
| Oct. 28, 1995 | [KR] | Rep. of Korea | 1995-30840 U |
| Oct. 28, 1995 | [KR] | Rep. of Korea | 1995-30841 U |

[51] Int. Cl.[6] .................................. G11B 23/00
[52] U.S. Cl. .................................. 360/107; 384/123
[58] Field of Search .................... 360/107, 84–85, 360/130.24; 384/123, 112, 135

[56] References Cited

U.S. PATENT DOCUMENTS

| 4,892,418 | 1/1990 | Asada et al. | 384/123 X |
| 4,972,283 | 11/1990 | Kim | 360/107 |
| 5,277,499 | 1/1994 | Kameyama | 384/123 |
| 5,323,076 | 6/1994 | Hajec | 310/90 |
| 5,407,281 | 4/1995 | Chen | 384/123 X |
| 5,453,892 | 9/1995 | Hasegawa et al. | 360/107 |
| 5,533,814 | 7/1996 | Slocum | 384/123 |
| 5,581,425 | 12/1996 | Choi | 360/107 |

*Primary Examiner*—John H. Wolff
*Attorney, Agent, or Firm*—Beveridge, DeGrandi, Weilacher & Young LLP

[57] ABSTRACT

Disclosed is a lubricating apparatus which can compensate for the radial load and the thrust load of the shaft. The lubricating apparatus includes a housing formed at an inner portion thereof with a pair of lubricant containing grooves, a journal bearing inserted into the housing, and lubricating pads having a lubricant therein. The lubricating pads are inserted into the lubricant containing grooves. A head drum assembly for a video cassette recorder is also disclosed. The assembly has a lower drum, an upper drum, a motor for generating a driving force, a shaft for transferring the driving force of the motor to the upper drum, and a bearing rotatably supporting the shaft. By compensating the radial load and thrust load of the shaft, jittering and wow-fluttering can be prevented while recording a screen information on a magnetic tape or reproducing the screen information from the magnetic tape.

16 Claims, 9 Drawing Sheets

DYNAMIC PRESSURE BEARING APPARATUS AND HEAD DRUM ASSEMBLY OF A VIDEO CASSETTE RECORDER UTILIZING THE SAME

BACKGROUND OF THE INVENTION

1. Field of the Invention

The present invention relates to a lubricating apparatus of a rotary unit, and more particularly to a dynamic pressure bearing.

2. Description of the Prior Art

In general, bearings are used in a rotary unit such as a laser beam printer, a head drum assembly of a video cassette recorder (hereinafter, referred to as a VCR) and the like. The bearings rotatably support and lubricate a shaft by a lubricating fluid.

A VCR generally includes a base (main chassis or deck), a running system installed on the base for drawing out a magnetic tape from a cartridge and for running the magnetic tape along a predetermined path, and a head drum assembly for recording and reproducing video signals on and from the magnetic tape. The head drum assembly includes an upper drum on which there are magnetic heads for recording and reproducing video signals on and from the tape, and a lower drum positioned below the upper drum, on which there is a motor for rotating the upper drum. The upper drum records or reproduces the video signals on and from the tape while the motor is in operation.

Nevertheless, if vibration and noise are generated during the rotation of the upper drum, the heads cannot record or reproduce the video signals on and from the tape clearly and the screen quality is deteriorated. Therefore, the vibration and noise should be controlled as much as possible. In order to settle the above-mentioned problems, a head drum assembly is provided with a lubricating apparatus. A lubricating apparatus reduces vibration and noise of an upper drum of a head drum assembly by supporting and lubricating a shaft which rotates the upper drum. A lubricating apparatus generally uses ball bearings or a fluid dynamic pressure bearing.

FIG. 1 shows a conventional head drum assembly of a VCR which uses a lubricating apparatus employing ball bearings. As shown in FIG. 1, a head drum assembly 100 includes a lower drum 110, an upper drum 120 for recording and reproducing audio and video signals on and from a magnetic tape (not shown), a motor 130 mounted on lower drum 110 for generating a rotating force, a shaft 140 for transferring the rotating force of motor 130 to upper drum 120, and a pair of ball bearings 150 provided between shaft 140 and lower drum 110 for rotatably supporting and lubricating shaft 140.

Motor 130 includes a stator 132 mounted on lower drum 110 at one side of the lower surface of lower drum 110, and a rotor 142 which is rotated in magnetic conjunction with stator 134. Rotor 134 is located radially spaced apart from stator 132. Shaft 140 is mounted on rotor 134 at the inner side of rotor 134 by a lower flange 142 and is fixed to upper drum 120 by an upper flange 144 at the upper portion thereof, so that shaft 140 and upper drum 120 rotate together with rotor 134 during the rotation of rotor 134.

Mounted on upper drum 120 are at least two magnetic heads 122 for recording and reproducing audio and video signals on and from the magnetic tape. Magnetic heads 121 are electrically connected to lower drum 110 through the lower surface of upper drum 120 and a rotary transformer 130 installed to the upper surface of lower drum 110.

Therefore, magnetic heads 122 can be electrically connected to peripheral devices, e.g., an amplifier or the like, while upper drum 120 is rotating. Formed at the inner side of lower drum 110 is an bearing 112 which receives ball bearings 150.

Each of ball bearings 150 includes an outer race 152 inserted into and fixed to the inner side of bearing housing 112, an inner race 154 into which shaft 140 is inserted, and a plurality of balls which are interposed between inner and outer races 152 and 154 to support and lubricate shaft 150.

Balls 156 are made of steel, and roll and slide between inner and outer races 152 and 154, thereby supporting and lubricating shaft 150. A lubricant may be supplied between inner and outer races 152 and 154 to reduce the friction of balls 156 against inner and outer races 152 and 154.

However, in the ball bearings 150, a vibration can be generated by the friction of balls against inner and outer races 152 and 154. As a result, the screen quality of the head drum 100 is deteriorated by the vibration of ball bearings 150. Further, the lubricating effect can be deteriorated due to the leakage of the lubricant over time.

Recently, fluid dynamic pressure bearings are used to overcome the above-mentioned disadvantages of ball bearings 150. Lubricating apparatuses using fluid dynamic pressure bearings are disclosed in U.S. Pat. No. 4,972,283 issued to Kim on Nov. 20, 1990 and U.S. Pat. No. 5,277,499 issued to Kameyama on Jan. 11, 1994.

FIG. 2 shows a head drum assembly using the lubricating apparatus of Kim. As shown in FIG. 2, an apparatus 210 of a head drum assembly 200 includes a shaft 220, the outer surface of which containing a plurality of slots 222 and a plurality of fluid guiding grooves 224, and includes a bearing housing on which a lubricant containing groove 232 and an air flowing groove 236 are formed.

Slots 222 are formed at the upper and lower portions of shaft 220, and fluid guiding grooves 224 are formed at the lower portion of shaft 220 adjacent lubricant containing groove 232. Lubricant containing groove 232 is formed at the inner side of bearing housing 230 at the lower portion of bearing housing 230, and contains the lubricant. Air flowing groove 236 is formed at the inner side of bearing housing 230 at a middle portion of bearing housing 230 and is connected to air flowing hole 234, through which air is introduced from outside. As shaft 220 rotates, the lubricant in lubricant containing groove 232 flows along fluid guiding groove 224 formed on the outer surface of shaft 220. The air introduced into bearing housing 230 through air flowing hole 234 is mixed in slots 222 with the lubricant flowing along fluid guiding groove 224.

Shaft 220 rises when it rotates by the rotating force of motor 240. Then, the lubricant in lubricant containing groove 232 flows to the outer surface of shaft 220 along fluid guiding groove 224. The air is introduced in to the interior of air flowing groove 236 through air flowing hole 234 of bearing housing 230. Mixed between shaft 220 and bearing housing 230 are the lubricant flowing along fluid guiding groove 224 and the air introduced into the interior of bearing housing 230. The mixed fluid flows along fluid guiding grooves 224 of shaft 220. As a result, the fluid pressure in fluid guiding grooves 224 becomes larger than the fluid pressure at the outer surface of shaft 220, where fluid guiding grooves 224 are not formed. Therefore, the radial load of shaft 220 is supported.

Nevertheless, in the lubricating apparatus 210 of Kim, it is not easy to form slots 222 and fluid guiding grooves 224 on the outer surface of shaft 220. Further, as the lubricant becomes depleted over time, thereby deteriorating the lubricating effect of the apparatus, a vibration can be generated during the rotation of shaft 220.

The lubricating apparatus of Kameyama was suggested to settle the abovementioned problems. The apparatus of Kameyama includes a shaft and a sleeve having a thrust receiver opposing an end surface of the shaft, into which the shaft is rotatably received. On the inner surface of the sleeve near an opening thereof is formed an annular groove. On the outer surface of the shaft is formed a plurality of shallow grooves. When the shaft rotates, a fluid flows between the inner surface of the sleeve and the outer surface of the shaft by an action of the shallow grooves. Then, the fluid flows upward from the center portion of the sleeve at which the shaft keeps in contact with the sleeve, thereby decreasing the friction between the shaft and the sleeve.

Nevertheless, in the lubricating apparatus of Kameyama, since the shaft rotates while it is floated from the center portion of the sleeve, the upper and lower portions of the shaft can be biased. The biasing of the shaft causes the vibration of the upper drum of a head drum assembly, thereby deteriorating the screen quality of the head drum assembly.

SUMMARY OF THE INVENTION

Accordingly, the first object of the present invention is to provide a dynamic pressure bearing which can prevent a vibration, can be easily manufactured, and can provide a long term lubrication.

The second object of the present invention is to provide a head drum assembly for a video cassette recorder which can record and reproduce a good quality screen by using the above dynamic pressure bearing.

To achieve the first object, the present invention provides a lubricating apparatus comprising:
  a journal bearing into which a shaft is rotatably inserted;
  a bearing housing into which the journal bearing is inserted, the bearing housing being formed at an inner portion thereof with a pair of lubricant containing grooves, the lubricant containing grooves being disposed in opposition to each other; and
  a pair of lubricating pads having a lubricant therein, the lubricating pads being inserted into the pair of lubricant containing grooves.

According to the preferred embodiment of the present invention, the journal bearing has a lubricant passage way which connects inner and outer portions of the journal bearing. Slots, through which the lubricant contained in the lubricant pad flows, are formed at the inner portion of the journal bearing. The lubricant flows into the journal bearing through the lubricant passage way and through the slots while forming an oil film between the shaft and the journal bearing, thereby compensating for the radial load of the shaft. In addition, the journal bearing is formed at an upper surface thereof with a plurality of supporting protrusions in order to compensate for a thrust load of the shaft.

The journal bearing is manufactured by a sintering metal which can contain the lubricant therein, by a soft white metal, or by a high molecular compound resin such as Teflon. In addition, the lubricating pad is manufactured by a liquid absorbing material such as a cotton or a sponge.

To achieve the second object, the present invention provides a head drum assembly for a video cassette recorder comprising:
  a lower drum;
  a motor for generating a driving force, the motor being installed in the lower drum;
  an upper drum for recording an a screen information on a magnetic tape or for reproducing the screen information from the magnetic tape, the upper drum being mounted on the lower drum;
  a transformer for electrically connecting a magnetic head to an external apparatus while the upper drum is being rotated, the transformer being installed between a lower surface of the upper drum and an upper surface of the lower drum;
  a shaft installed in the motor so as to transfer the driving force of the motor to the upper drum;
  a bearing housing formed at an inner portion thereof with a pair of lubricant containing grooves, the lubricant containing grooves being disposed in a longitudinal direction of the bearing housing in opposition to each other, the lubricant containing grooves having a cylindrical shape, the bearing housing being disposed at an inner portion of the lower drum;
  a journal bearing into which the shaft is rotatably inserted, the journal bearing being connected to the lubricant containing grooves, the journal bearing being fixed and inserted into upper and lower portions of the bearing housing respectively, the journal bearing having a first lubricant passage way which is longitudinally formed at an outer portion of the journal bearing, having a second lubricant passage way longitudinally formed at an inner portion of the journal bearing, having a third lubricant passage way which connects upper ends of first and second lubricant passage ways to each other and is formed on an upper surface of the journal bearing, and having a fourth lubricant passage way which connects lower ends of first and second lubricant passage ways to each other and is formed on a lower surface of the journal bearing; and
  a pair of lubricating pads for receiving a lubricant supplied between the journal bearing and the shaft, the lubricating pads being inserted into the pair of lubricant containing grooves.

According to the preferred embodiment of the present invention, the head drum assembly further comprises a cover for rotatably supporting the shaft in order to compensate for the thrust load of the shaft.

In addition, the journal bearing is formed at the inner portion thereof with slots through which the lubricant contained in the lubricant pad flows. The lubricant contained in the lubricant pad flows into the journal bearing through the slots while forming an oil film between the shaft and the journal bearing, thereby compensating for the radial load of the shaft. In addition, the journal bearing is formed at an upper surface thereof with a plurality of supporting protrusions in order to compensate for a thrust load of the shaft.

The lubricating apparatus of the present invention can continuously supply the lubricant into the journal, thereby preventing the friction of the shaft. The lubricating apparatus of the present invention has a simple construction, so it may be easily manufactured.

In addition, according to the head drum assembly for a video cassette recorder of the present invention, the radial load and the thrust load of the shaft can be effectively compensated so that jittering and wow-fluttering can be effectively prevented.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENTS

Figure 1:
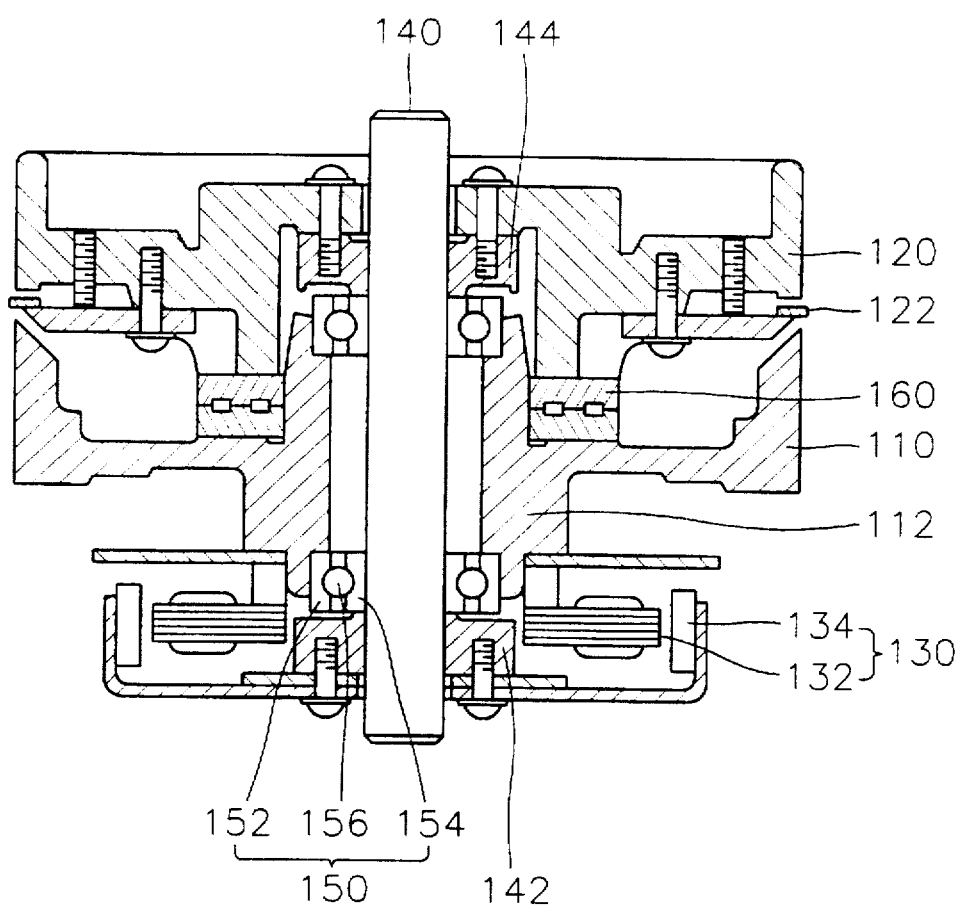
FIG. 1 is a longitudinal sectional view of a head drum assembly having a conventional lubricating apparatus employing ball bearings.
Figure 2:
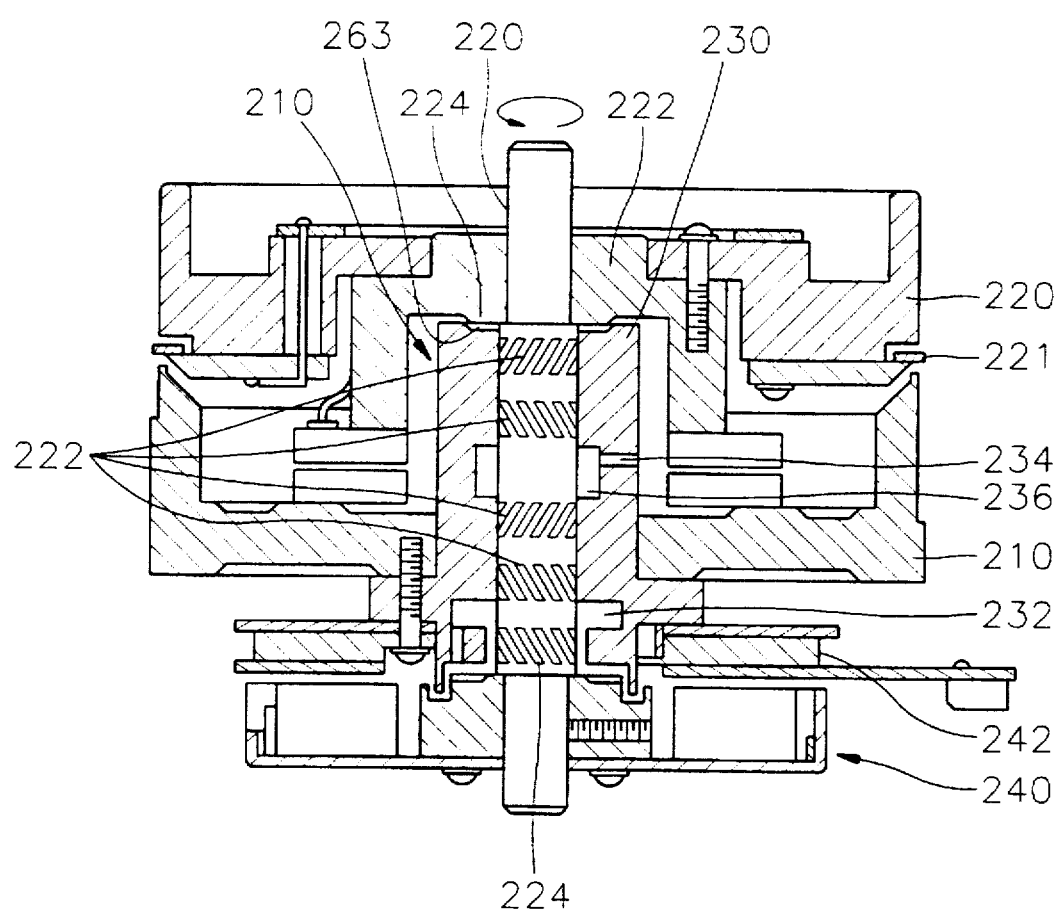
FIG. 2 is a longitudinal sectional view of a head drum assembly having a conventional lubricating apparatus employing a fluid dynamic pressure bearing.

Hereinafter, preferred embodiments of the present invention will be described in detail with reference to the accompanying drawings. In the drawings, similar reference numbers are used for similar elements.

Embodiment 1

Figure 3:
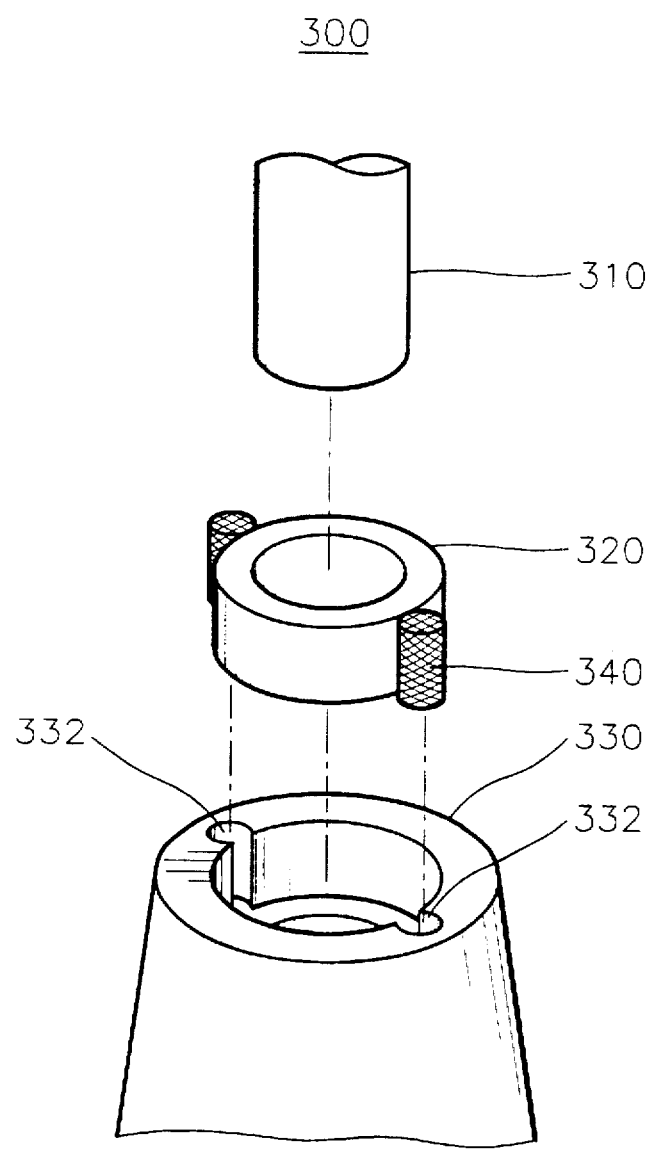
FIG. 3 is a perspective view for showing a lubricating apparatus according to a first embodiment of the present invention.

FIG. 3 is a perspective view of a lubricating apparatus 300 according to a first embodiment of the present invention. Lubricating apparatus 300 of the present invention includes a journal bearing 320 into which a shaft 310 is rotatably inserted, and a bearing housing 330 which receives journal bearing 320 and is formed at its inner portion with a pair of lubricant containing grooves 332 which are disposed in opposition to each other.

Journal bearing 320, into which a rotatable shaft 310 is rotatably inserted, is fixedly inserted into bearing housing 330, and an outer wall of journal bearing 320 makes contact with an inner wall of bearing housing 330. Journal bearing 320 is manufactured by sintering particles of an alloy, such as a copper alloy, in such a manner that journal bearing 320 can contain a lubricant therein. Prior to inserting journal bearing 320 into bearing housing 330, journal bearing 320 is dipped into a lubricant so as to absorb the lubricant therein.

Preferably, the pair of lubricant containing grooves 332 of bearing housing 330 are cylindrically shaped in the longitudinal direction of bearing housing 330. The pair of lubricant containing grooves 332 are disposed in opposition to each other about a center of bearing housing 330.

A pair of lubricating pads 340 are inserted into the pair of lubricant containing grooves 332. The pair of lubricating pads 340 have a cylindrical shape and are made of a lubricant absorbing material, such as cotton or sponge. Lubricating pads 340 absorb a large amount of the lubricant and supply the absorbed lubricant to journal bearing 320.

Lubricating apparatus 300 according to the first embodiment of the present invention operates as follows.

Firstly, lubricating pads 340 are inserted into lubricant containing grooves 332 of bearing housing 330. Then, journal bearing 320 is inserted into bearing housing 330. Shaft 310 is inserted into journal bearing 320.

When shaft 310 is rotated by a motor 740 (see FIG. 9), the lubricant contained in journal bearing 320 flows between an inner wall of journal bearing 320 and an outer wall of shaft 310. The lubricant which has flowed between the inner wall of journal bearing 320 and the outer wall of shaft 310 forms an oil film thereto, thereby compensating for the radial load of shaft 310. When shaft 310 stops its rotation, the lubricant remaining between the inner wall of journal bearing 320 and the outer wall of shaft 310 returns to journal bearing 320. In addition, if the lubricant contained in journal bearing 320 is consumed, the lubricant contained in lubricating pads 340 leaks into journal bearing 320. A user can continuously supply the lubricant into inner portions of lubricating pads 340. Accordingly, journal bearing 320 may continuously support shaft 310 even when a long amount of time has lapsed.

Embodiment 2

Figure 4:
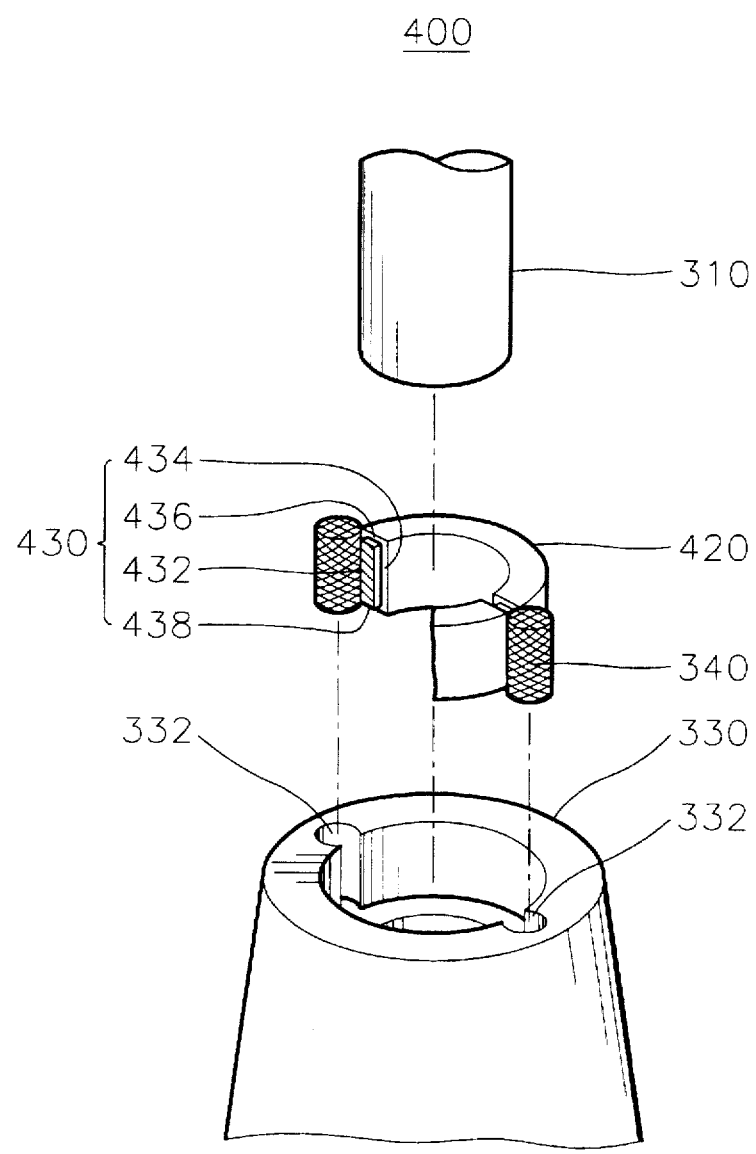
FIG. 4 is a perspective view for showing a lubricating apparatus according to a second embodiment of the present invention.

FIG. 4 is a perspective view of a lubricating apparatus 400 according to a second embodiment of the present invention. Lubricating apparatus 400 of the present invention includes a journal bearing 420 into which a shaft 310 is rotatably inserted, and a bearing housing 330 which receives journal bearing 420 and is formed at its inner portion with a pair of lubricant containing grooves 332 which are disposed in opposition to each other.

Since bearing housing 330 and lubricating pads 340 of this embodiment are identical to bearing housing 330 and lubricating pads 340 of the first embodiment, they will not be further described below.

Journal bearing 420 has a lubricant passage way 430 through which flows the lubricant contained in lubricating pads 340. The inner portion of journal bearing 420 communicates with the outer portion of journal bearing 420 through lubricant passage way 430. Lubricant passage way 430 includes first lubricant passage ways 432 which are longitudinally formed at the outer portions of journal bearing 420 and are connected to lubricant containing grooves 332, second lubricant passage ways 434 which are longitudinally formed at the inner portions of journal bearing 420, third lubricant passage ways 436 which connect upper ends of first and second lubricant passage ways 432 and 434 to each other and are formed on upper surface portions of journal bearing 420, and fourth lubricant passage way 438 which connects lower ends of first and second lubricant passage ways 432 and 434 to each other and formed on lower surface portions of journal bearing 420. Accordingly, the lubricant contained in the pair of lubricating pads 340 flows into the inner portion of journal bearing 420 by way of first lubricant passage ways 432, third and fourth lubricant passage ways 436 and 438, and second lubricant passage ways 434.

Journal bearing 420, into which shaft 310 is inserted is, fixedly inserted into bearing housing 330, and an outer wall of journal bearing 420 makes contact with an inner wall of bearing housing 330. Journal bearing 420 is manufactured by sintering particles of an alloy such as a copper alloy, or is manufactured by a soft metal such as a white metal. If journal bearing 420 is manufactured by sintering the copper alloy, journal bearing 420 is dipped into a lubricant for a while so as to absorb the lubricant therein.

Accordingly, journal bearing 420 containing the lubricant is fixedly inserted into bearing housing 330. In this case, the lubricant contained in journal bearing 420 flows between journal bearing 420 and shaft 310 when journal bearing 320 rotates, thereby compensating for the radial load of shaft 310. If journal bearing 420 is manufactured by the soft metal, the lubricant contained in the pair of lubricating pads 340 flows into the inner portion of journal bearing 420 through lubricant passage way 430, thereby compensating for the radial load of shaft 310.

Lubricating apparatus 400 according to the second embodiment of the present invention operates as follows.

Firstly, lubricating pads 340 are inserted into lubricant containing grooves 332 of bearing housing 330. Then, journal bearing 420 is inserted into bearing housing 330. Shaft 310 is rotatably inserted into journal bearing 420.

When shaft 310 is rotated by a motor 350 (see FIG. 9), the lubricant contained in journal bearing 420 flows between an inner wall of journal bearing 420 and an outer wall of shaft 310. The lubricant which has flowed between the inner wall of journal bearing 420 and the outer wall of shaft 310 may form an oil film thereto, thereby compensating for the radial load of shaft 310. In addition, the lubricant contained in lubricating pads 340 flows into the inner portion of journal bearing 420 through lubricant passage way 430. The lubricant which has flowed into the inner portion of journal bearing 420 forms an oil film between journal bearing 420 and shaft 310, thereby compensating for the radial load of shaft 310. When shaft 310 stops its rotation, the lubricant remaining between journal bearing 420 and shaft 310 returns to journal bearing 320. In addition, if the lubricant contained in journal bearing 420 is consumed, the lubricant contained in lubricating pads 340 leaks into journal bearing 420. A user can continuously supply the lubricant into inner portions of lubricating pads 340.

Embodiment 3

Figure 5:
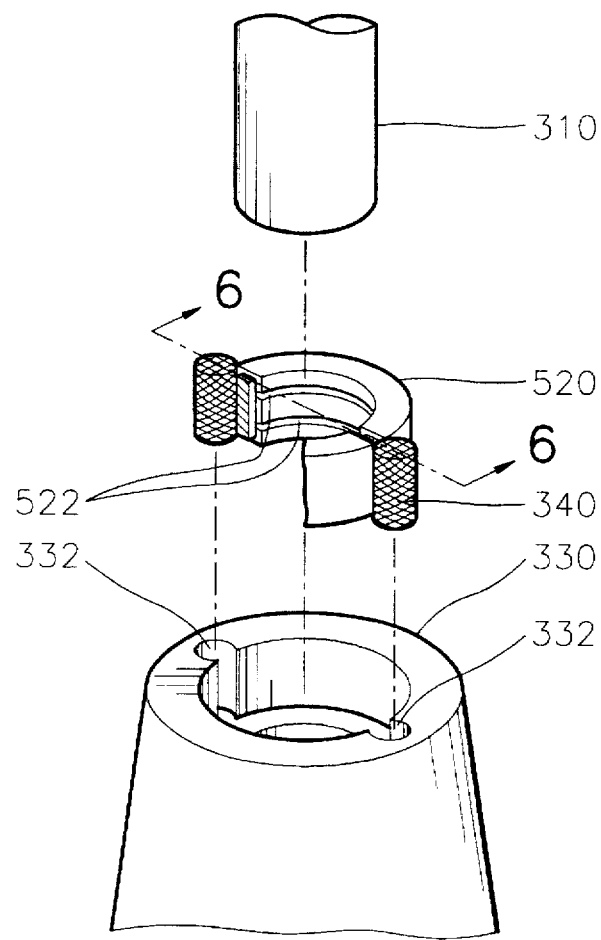
FIG. 5 is a perspective view for showing a lubricating apparatus according to a third embodiment of the present invention.
Figure 6:
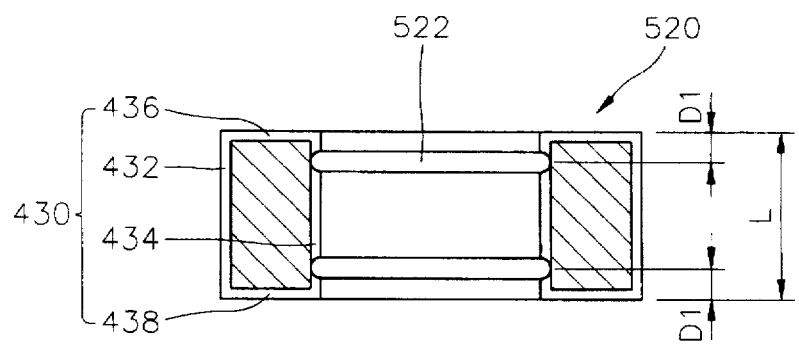
FIG. 6 is a sectional view for showing a journal bearing of FIG. 5, taken along the line A—A of FIG. 5.

FIGS. 5 and 6 are perspective views of a lubricating apparatus 500 according to a third embodiment of the present invention. In the figures, lubricating apparatus 500 of the present invention includes a journal bearing 520 into which a shaft 310 is inserted, and a bearing housing 330 which receives journal bearing 520 and is formed at its inner portion with a pair of lubricant containing grooves 332 which are disposed in opposition to each other.

Bearing housing 330 and lubricating pads 340 of this embodiment are identical to bearing housing 330 and lubricating pads 340 of the first and second embodiments, and a lubricant passage way 430 of this embodiment is identical to lubricant passage way 430 of the second embodiment, so they will not be further described below.

Journal bearing 520 has at least two slots 522 which are connected to second lubricant passage ways 434. Preferably, slots 522 are formed at inner upper and lower portions of journal bearing 520. The lubricant which is supplied to second lubricant passage way 434 by way of lubricant passage way 430 flows along slots 522, thereby forming an oil film between an inner wall of journal bearing 520 and an outer wall of shaft 310.

As shown in FIG. 6, each slot 522 is spaced at a predetermined length D1 apart from a lower end and (or upper end) of journal bearing 520. The lubricating area of journal bearing 520 is maximized when the length D1 is within the below inequality.

$$L/100 \leq D1 \leq L/10 \qquad (1)$$

In the above inequality, D1 is a length from the center of slot 522 to the upper end (or lower end) of journal bearing 520, and L is a length of journal bearing 520.

Journal bearing 520, into which shaft 310 is inserted is fixedly inserted into bearing housing 330, and an outer wall of journal bearing 520 makes contact with an inner wall of bearing housing 330. Journal bearing 520 is manufactured by a soft metal such as a white metal, or by a high molecular compound resin such as Teflon. When shaft 310 rotates, the lubricant contained in lubricating pads 340 is supplied into the inner portion of journal bearing 520 through lubricant passage way 430, thereby compensating for the radial load of shaft 310.

Lubricating apparatus 500 according to the third embodiment of the present invention operates as follows.

Firstly, lubricating pads 340 are inserted into lubricant containing grooves 332 of bearing housing 330. Then, journal bearing 520 is inserted into bearing housing 330. Shaft 310 is rotatably inserted into journal bearing 520.

When shaft 310 is rotated by a motor 740 (see, FIG. 9), the lubricant contained in lubricating pads 340 flows between the inner wall of journal bearing 520 and the outer wall of shaft 310 through lubricant passage way 430 of journal bearing 520 and slots 522. The lubricant forms an oil film between journal bearing 520 and shaft 310, thereby compensating for the radial load of shaft 310. When shaft 310 stops its rotation, the lubricant remaining between journal bearing 520 and shaft 310 returns into lubricating pads 340. In addition, when the lubricant contained in lubricating pads 340 is consumed, a user can further supply the lubricant into inner portions of lubricating pads 340.

Embodiment 4

Figure 7:
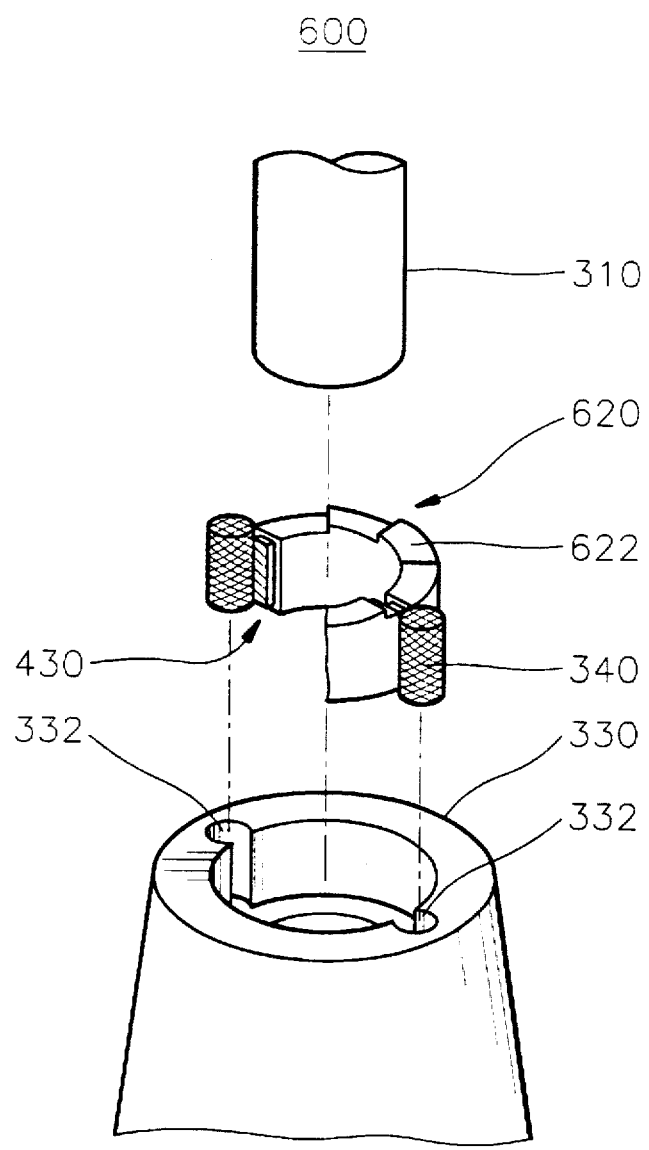
FIG. 7 is a perspective view for showing a lubricating apparatus according to a fourth embodiment of the present invention.
Figure 8:
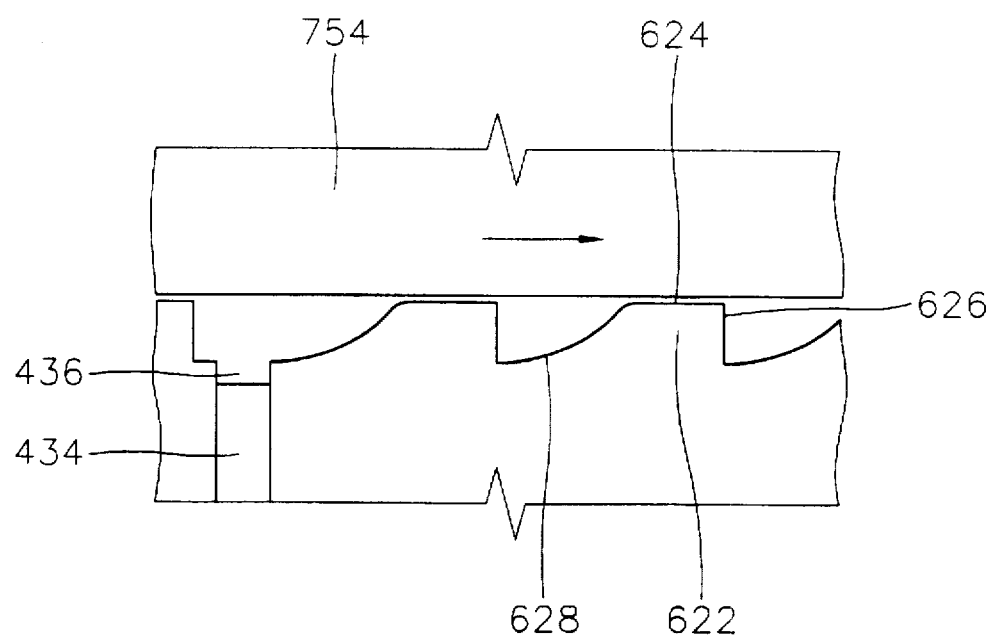
FIG. 8 is perspective view for explaining a supporting of a thrust load by the journal bearing of FIG. 7.

In FIGS. 7 and 8, there is shown a lubricating apparatus according to the fourth embodiment of the present invention. Referring to the figures, the apparatus according to the fourth embodiment of the present invention includes a journal bearing 620 into which a shaft 310 is inserted, wherein on the upper surface of journal bearing 620 are formed a plurality of protrusions 622 which support the thrust load of shaft 310, and includes a bearing housing 330 into which journal bearing 620 is inserted, wherein a pair of lubricant containing grooves 332 are formed opposite to each other.

Since bearing housing 330 and lubricating pads 340 of the lubricating apparatus 500 according to the fourth embodiment of the present invention are the same as bearing housing 330 and lubricating pads 340 of the lubricating apparatuses 200 and 300, and lubricant passage ways 430 of the lubricating apparatus 500 according to the fourth embodiment of the present invention are the same as lubricant passage ways 430 according to the third embodiment of the present invention, the explanation of bearing housing 330, lubricating pads 340, and passage ways 430 will be omitted in the description below.

A plurality of protrusions 622 are formed on the upper surface of journal bearing 520. Each of protrusions 622 are defined by a support surface 624, a side wall 626, and an inclined surface 628 connecting support surface 624 and side wall 626. Third passage ways 436 are formed on inclined surfaces 628 adjacent the lower end of side walls 626. The lubricant in each of lubricating pads 340 flows onto support surfaces 624 through first passage ways 432 and inclined surfaces 628, and onto the inner surface of journal bearing 320 through first, third, fourth, and second passage ways 432, 436, 438, and 434, thereby forming an oil film between shaft 310 and journal bearing 620.

Shaft 310 is rotatably inserted into journal bearing 620 and makes contact with the inner surface of bearing housing 330. At one end of shaft 310, shaft 310 is inserted into and fixed to a flange on which there is an upper drum (refer to FIG. 9) of a VCR. Journal bearing 620 is inserted into and fixed to the inner surface of bearing housing 330. Journal bearing 620 is made of a soft metal such as a white metal or a high molecular synthetic resin such as Teflon. When shaft 310 rotates, the lubricant in lubricating pads 340 is supplied onto the inner surface of journal bearing 620 via lubricant passage ways 430, thereby supporting the radial load of shaft 310. Further, as shown in FIG. 8, the lubricant flows into support surfaces 624 via inclined surfaces 628 and forms an oil film between support surfaces 624 and the upper surface of flange 314, thereby supporting the thrust load of shaft 310.

Hereinafter, the operation of the lubricating 600 according to the fourth embodiment of the present invention will be explained.

At first, lubricating pads 340 are respectively inserted into each of slots 332, and journal bearing 520 is inserted into bearing housing 330. Shaft 310 is rotatably inserted into the inner surface of journal bearing 520.

When shaft 310 is rotated by a motor (refer to FIG. 9) or the like, the lubricant in lubricating pads 340 flows into between the inner surface of journal bearing 620 and the outer surface of shaft 310, via lubricant passage ways 430 of journal bearing 620. The lubricant forms an oil film between journal bearing 620 and shaft 310, thereby supporting the radial load of shaft 310. On the other hand, when shaft 310 is rotated by the motor, the lubricant in lubricating pads 340 flows onto support surface 624 via first passage ways 342 and inclined surfaces 628. The lubricant forms an oil film between support surfaces 624 and flange 314, thereby supporting the thrust load of shaft 310.

If shaft 310 stops rotating, the lubricant between shaft 310 and journal bearing 320 retracts into lubricating pads 340. Further, when the lubricant in the interior of lubricating pads 340 is depleted, the lubricant can be additionally supplied into the interior lubricating pads 340.

Embodiment 5

Figure 9:
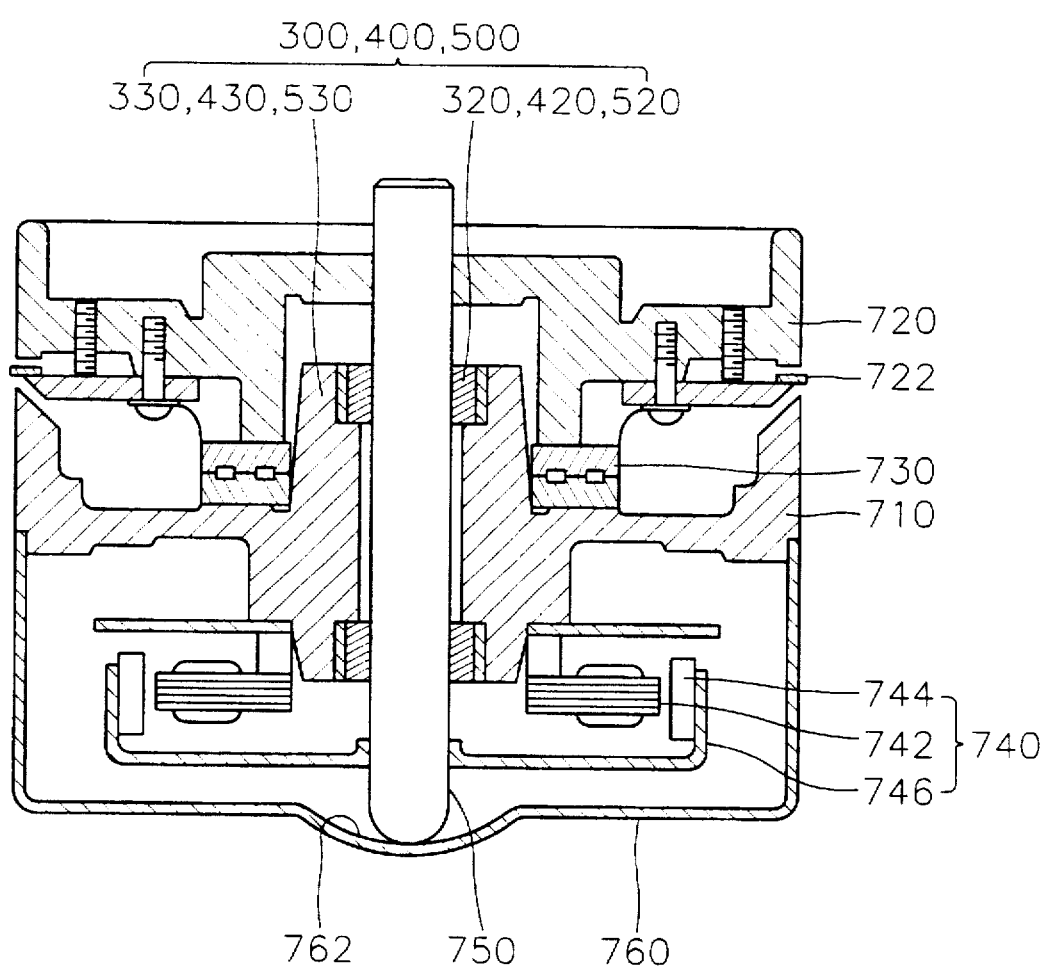
FIG. 9 is a longitudinal sectional view of a head drum assembly having a lubricating apparatus according to the first, second, third embodiment of the present invention.

FIG. 9 shows a head drum assembly according to the fifth embodiment of the present invention, which employs a lubricating apparatus according to the first, second, or third embodiment.

As shown in FIG. 9, the head drum assembly 700 according to the fifth embodiment of the present invention includes a lower drum 710, an upper drum which records and reproduces video information on and from a magnetic tape (not shown), a motor 740 for generating a driving force which is mounted in lower drum 710, a shaft 750 which transfers the driving force of motor 740 to upper drum 720, and bearings 300, 400, and 500, into which shaft 750 is inserted, and which supports and lubricates shaft 750.

Lower drum 710 is fixed to a base of the VCR. Motor 740 includes a stator 742 mounted at one side of the lower surface of lower drum 710, a rotor 742 which is radially spaced apart from stator 742 and is rotated in magnetic conjunction with stator 742, and a rotary plate 744 on which rotor 742 is inserted and which rotates together with rotor 742. Upper drum 720 is inserted into the upper portion of shaft and rotates together with shaft 750.

Located at the inside of lower drum 710 are bearings 300, 400, or 500 which rotatably support shaft 750. Bearing housing 330, 430, or 530 is integrally formed with lower drum 710. At the upper and lower portions of bearing housing 330, 430, or 530, two journal bearings 320, 420, or 520 are respectively inserted into bearing housing 330, 430, or 530.

Mounted on upper drum 720 are at least two magnetic heads 722 which record and reproduce video information on and from the magnetic tape during the rotation of shaft 750. Heads 722 are electrically connected to peripheral devices installed between the lower surface of upper drum 720 and the upper surface of lower drum 710. Therefore, heads 722 maintain electrical connection with a power source or the like while upper drum 720 is rotating.

Hereinafter, the operation of the head drum assembly 700 according to the fifth embodiment of the present invention will be explained.

If a current is applied to stator 742 of motor 740, rotor 744 fixed to shaft 750 is rotated in conjunction with stator 742. Namely, while upper drum 720 is rotating together with shaft 750, heads mounted on upper drum 720 record or reproduce the information on the tape. The information recorded and reproduced by heads 722 is transferred to other devices through rotary transformer 730.

At the same time, when upper drum 720 and shaft 750 rotates, the lubricant in the interior of journal bearing 320, 420, or 520 flows out between journal bearing 320, 420, or 520 and shaft 750, thereby forming an oil film. Journal bearing 320, 420, or 520 supports the radial load of shaft 750 by the oil film. Further, if the lubricant in the interior of journal bearing 320, 420, or 520 is consumed, the lubricant in lubricating pads 340 is absorbed into the interior of journal bearing 320, 420, or 520, and then flows out between journal bearing 320, 420, or 520 and shaft 750. Therefore, journal bearing 320, 420, or 520 can effectively support the radial load of shaft 750. On the other hand, the thrust load of shaft 750 is supported by a support recess 762 of cover 760.

In the head drum assembly according to the embodiment, radial and thrust loads of shaft 750 can be effectively supported by bearing 300, 400, or 500, thereby preventing vibration and noise of the head drum assembly. Therefore, information can be clearly recorded and reproduced on and a magnetic tape, so the screen quality can be improved.

Embodiment 6

Figure 10:
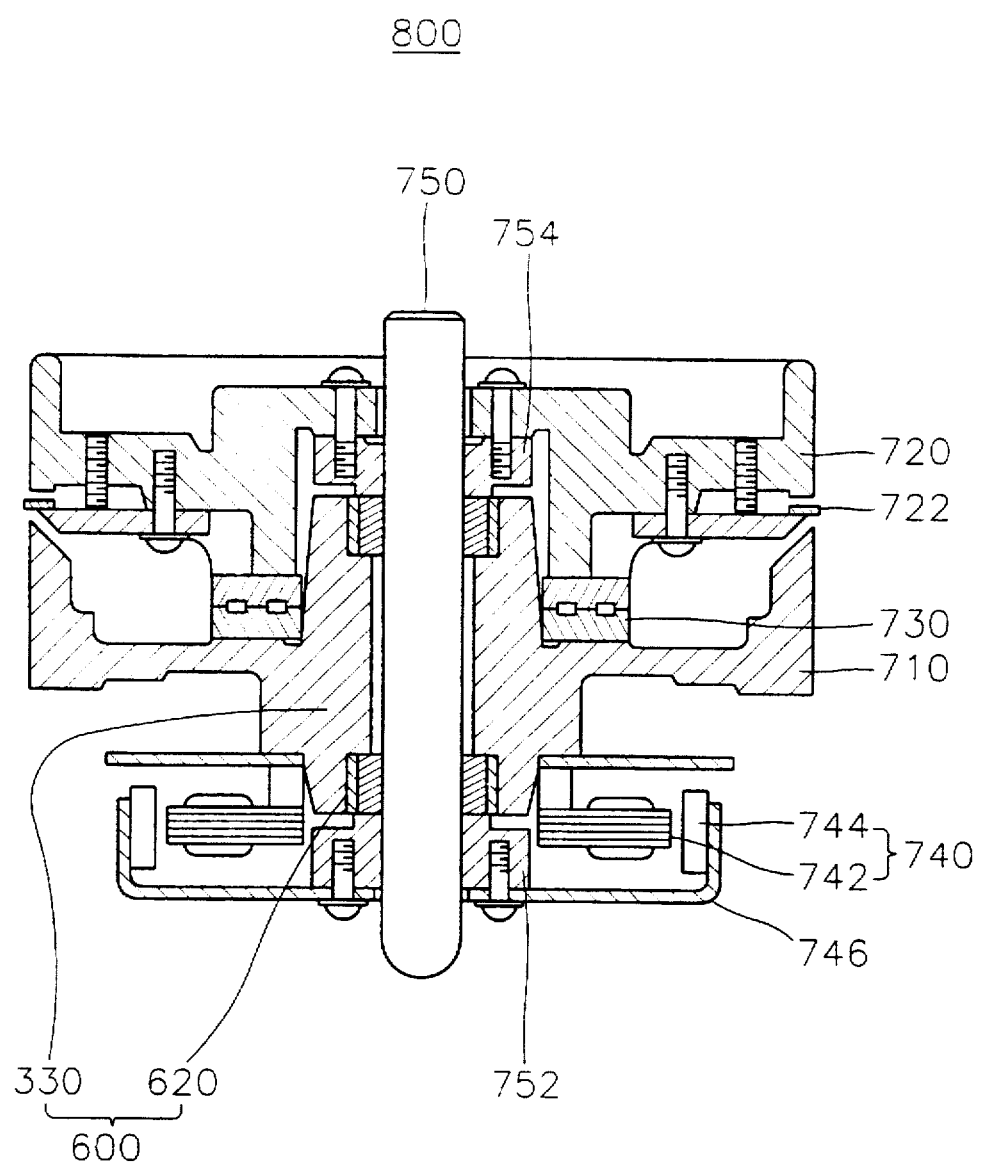
FIG. 10 is a longitudinal sectional view of a head drum assembly having a lubricating apparatus according to the fourth embodiment of the present invention.

FIG. 10 shows a head drum assembly according to the sixth embodiment of the present invention, which employs a lubricating apparatus according to the fourth embodiment.

As shown in FIG. 10, all elements of the head drum assembly 800 except for journal bearings 620 and cover 760 are the same in the sixth embodiment as the fifth embodiment, so the explanation thereof will be omitted.

A rotary plate 746 of a motor 740 is mounted on a shaft 750 by a first flange 752 so that shaft 750 rotates together with a rotor 742 of motor 740. At the upper portion of shaft 750, shaft 750 is inserted into a second flange 754. An upper drum 720 is fixed to second flange 754 by screws so as to rotate together with shaft 750. Second flange 754 makes contact with a plurality of supporting protrusions 622 of an upper journal bearing 600. The thrust and radial loads of shaft 750 are respectively supported by the plurality of supporting protrusions 622 and the inner peripheral surface of upper and lower bearings 600.

Hereinafter, the operation of the head drum assembly 800 according to the sixth embodiment of the present invention will be explained.

When shaft 750 is rotated by the driving force of motor 740 or the like, the lubricant contained in lubricating pads 340 flows between the inner surface of journal bearing 620 and the outer surface of shaft 310, via lubricant passage ways 430 of journal bearings 620. The lubricant forms an oil film between journal bearing 620 and shaft 310 to support the radial load of shaft 750. On the other hand, when shaft 750 is rotated by the driving force of motor 740 or the like, the lubricant in lubricating pads 340 flows onto support surfaces 624 via first passages 342 and inclined surfaces 628. The lubricant forms an oil film between support surfaces 624 and second flange 745 to support the thrust load of shaft 750.

As described in the first through sixth embodiments, since the lubricating apparatus according to the present invention can effectively support the radial and thrust loads of the shaft and can be additionally supplied the lubricant, it can prevent deterioration of a lubricating effect of the assembly. Since the structure of the apparatus is simple and the apparatus is easy to manufacture, the manufacturing cost of the assembly can be reduced.

Further, the head drum assembly of the VCR using the lubricating apparatus according to the present invention can prevent vibration and noise during the rotation of the upper drum of the VCR. Since it supports and lubricates the shaft rotating the upper drum, information can be clearly recorded and reproduced on and from a magnetic tape, so the screen quality of the VCR is improved.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A lubricating apparatus comprising:

a bearing housing formed at an inner portion thereof with a pair of lubricant containing grooves, the lubricant containing grooves being disposed in a longitudinal direction of the bearing housing in opposition to each other, the lubricant containing grooves having a cylindrical shape;

a journal bearing into which a rotatable shaft is inserted, the journal bearing being connected to the lubricant containing grooves, the journal bearing having first lubricant passage ways which are longitudinally formed at outer portions of the journal bearing, having second lubricant passage ways longitudinally formed at inner portions of the journal bearing, having third lubricant passage ways which connect upper ends of first and second lubricant passage ways to each other and are formed at upper surface portions of the journal bearing, and having fourth lubricant passage ways which connect lower ends of first and second lubricant passage ways to each other and are formed at lower surface Portions of the journal bearing; and a pair of lubricating pads having a lubricant therein, the lubricating pads being inserted into the pair of lubricant containing grooves, the lubricant contained in the lubricating pads flowing into the inner portion of the journal bearing by way of first, third fourth, and second lubricant passage ways.

2. A lubricating apparatus as claimed in claim 1, wherein the journal bearing is comprised of sintered particles of an alloy.

3. A lubricating apparatus as claimed in claim 1, wherein the journal bearing is comprised of a higher molecular synthetic resin.

4. A lubricating apparatus as claimed in claim 1, wherein the lubricating pad is comprised of cotton a liquid absorbing material.

5. A lubricating apparatus as claimed in claim 1, wherein the journal bearing has at least two slots which are connected to the second lubricant passage ways, the slots being formed at inner wall's upper and lower portions of the journal bearing, for forming an oil film between an upper wall of said journal bearing and an outer wall of said rotatable shaft.

6. A lubricating apparatus as claimed in claim 5, wherein a length from the slot to an end of the journal bearing is within a following inequality:

$L/100 \leq D1 \leq L/10$ in which D1 is the length from a center of the slot to the end of the journal bearing, and L is a length of the journal bearing.

7. A lubricating apparatus as claimed in claim 1, wherein the journal bearing has a plurality of supporting protrusions which compensate for a thrust load of the shaft, the supporting protrusions being formed at an upper surface of the journal bearing.

8. A lubricating apparatus as claimed in claim 7, wherein the supporting protrusions are defined by a supporting surface compensating for the thrust load of the shaft, by a side wall, and by an inclined surface which connects the supporting surface to the side wall, the third lubricant passage way being formed at the inclined surface.

9. A head drum assembly for a video cassette recorder comprising:

a lower drum;

a motor for generating a driving force, the motor being installed in the lower drum;

an upper drum for recording video information on a magnetic tape or for reproducing the screen information from the magnetic tape, the upper drum being mounted on the lower drum;

a transformer for electrically connecting a magnetic head to an external apparatus while the upper drum is being rotated, the transformer being installed between a lower surface of the upper drum and an upper surface of the lower drum;

a rotatable shaft installed in the motor so as to transfer the driving force of the motor to the upper drum;

a bearing housing formed at an inner portion thereof with a pair of lubricant containing grooves, the lubricant containing grooves being disposed in a longitudinal direction of the bearing housing in opposition to each other, the lubricant containing grooves having a cylindrical shape, the bearing housing disposed at an inner portion of the lower drum;

a journal bearing into which the rotatable shaft is inserted, the journal bearing being connected to the lubricant containing grooves, the journal bearing being fixed and inserted into upper and lower portions of the bearing housing respectively, the journal bearing having first lubricant passage ways which are longitudinally formed at outer portions of the journal bearing, having second lubricant passage ways longitudinally formed at inner portions of the journal bearing, having third lubricant passage way ways which connect upper ends of first and second lubricant passage ways to each other and are formed on upper surface portions of the journal bearing, and having fourth lubricant passage ways which connect lower ends of first and second lubricant passage ways to each other and are formed on lower surface portions of the journal bearing; and a pair of lubricating pads for receiving a lubricant supplied between the journal bearing and the shaft, the lubricating pads being inserted into the pair of lubricant containing grooves.

10. A head drum assembly for a video cassette recorder as claimed in claim 9, further comprising a cover for rotatably supporting the shaft, the cover being mounted on the lower drum and being formed at a center thereof with a supporting groove.

11. A head drum assembly for a video cassette recorder as claimed in claim 9, wherein the journal bearing is comprised of sintered particles of an alloy.

12. A head drum assembly for a video cassette recorder as claimed in claim 9, wherein the journal bearing is comprised of a high-molecular synthetic resin.

13. A head drum assembly for a video cassette recorder as claimed in claim 9, wherein the lubricating pad is comprised of a liquid absorbing material.

14. A head drum assembly for a video cassette recorder as claimed in claim 9, wherein the journal bearing has at least two slots connected to the second lubricating passage ways, the slots being formed at an inner wall portions of the journal bearing, and a length from the slot to an end of the journal bearing being within a following inequality: $L/100 \leq D1 \leq L/10$ in which D1 is the length from a center of the slot to the end of the journal bearing, and L is a length of the journal bearing.

15. A head drum assembly for a video cassette recorder as claimed in claim 9, further comprising a first flange fixedly inserted into a lower end of the shaft, and a second flange fixedly inserted into an upper end of the shaft, the motor being coupled to the first flange, the upper drum being coupled to the second flange.

16. A head drum assembly for a video cassette recorder as claimed in claim 15, wherein the journal bearing has a plurality of supporting protrusions which compensate for a thrust load of the shaft, the supporting protrusions being formed at the upper surface of the journal bearing, the supporting protrusions being defined by a supporting surface compensating for the thrust load of the shaft, by a side wall, and by an inclined surface which connects the supporting surface to the side wall, the third lubricant passage way being formed at the inclined surface.

* * * * *